Patented June 12, 1928.

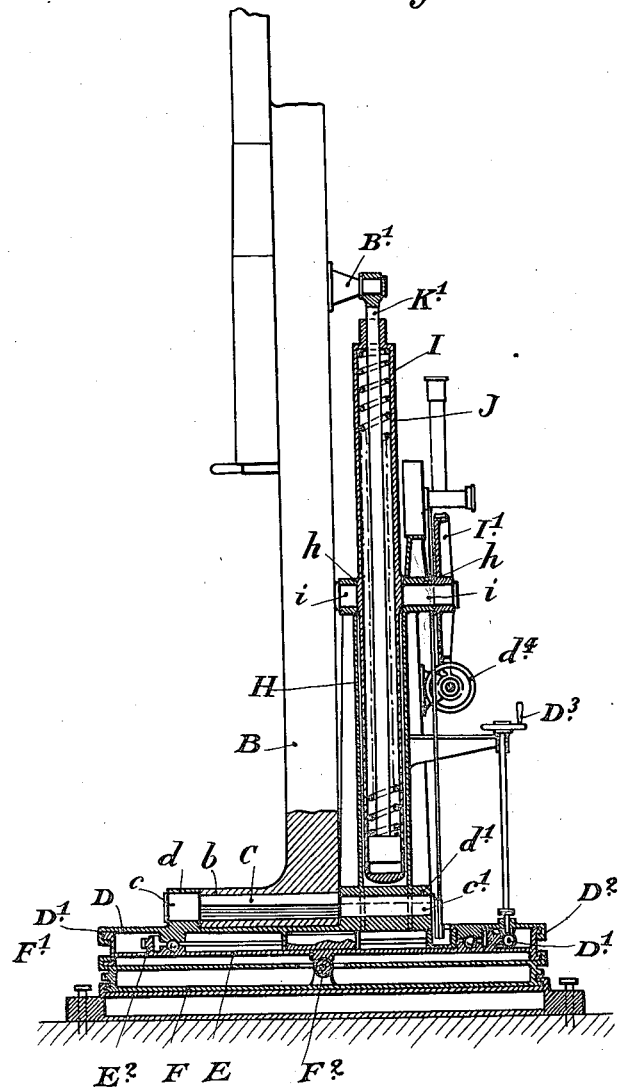

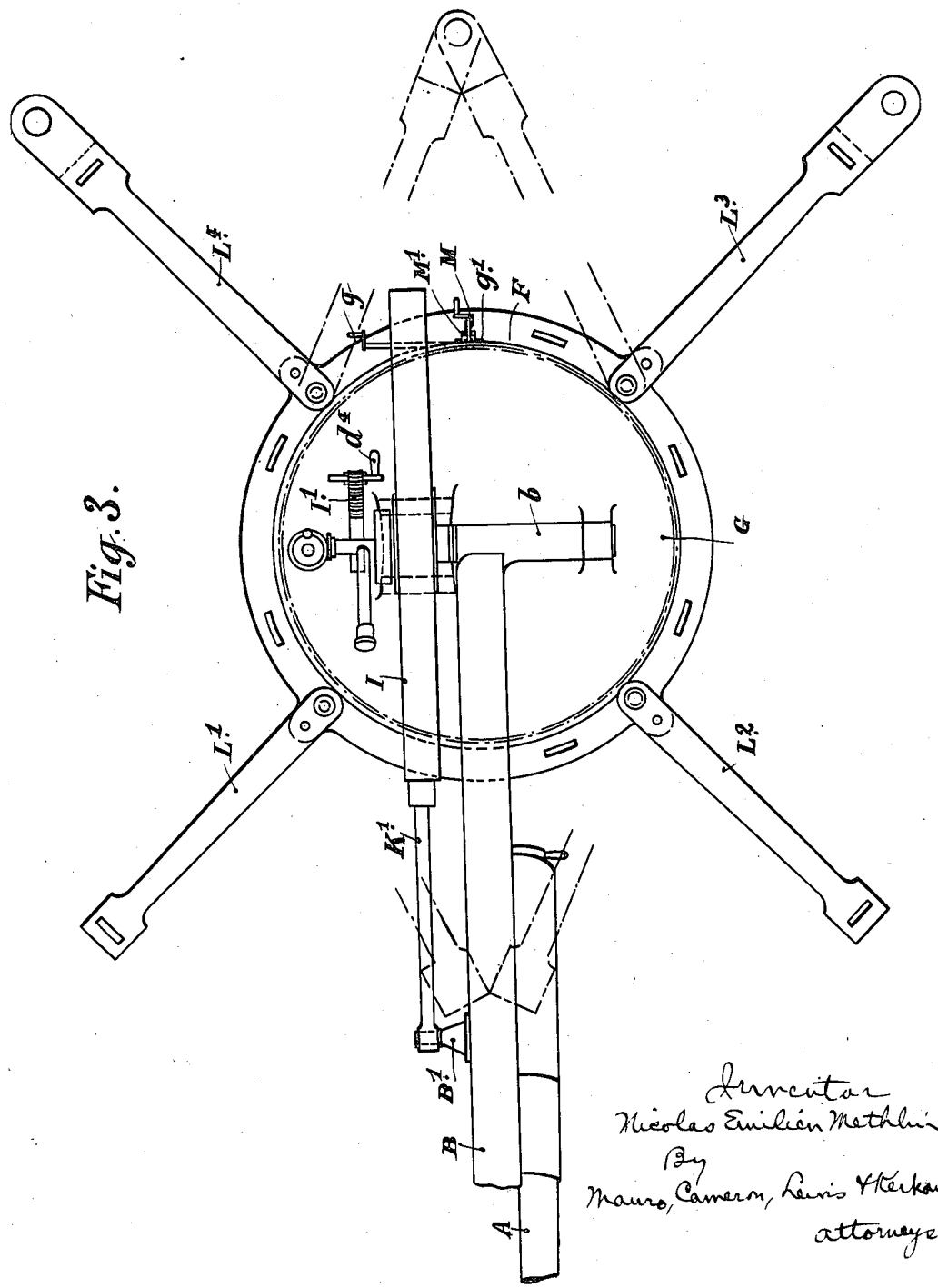

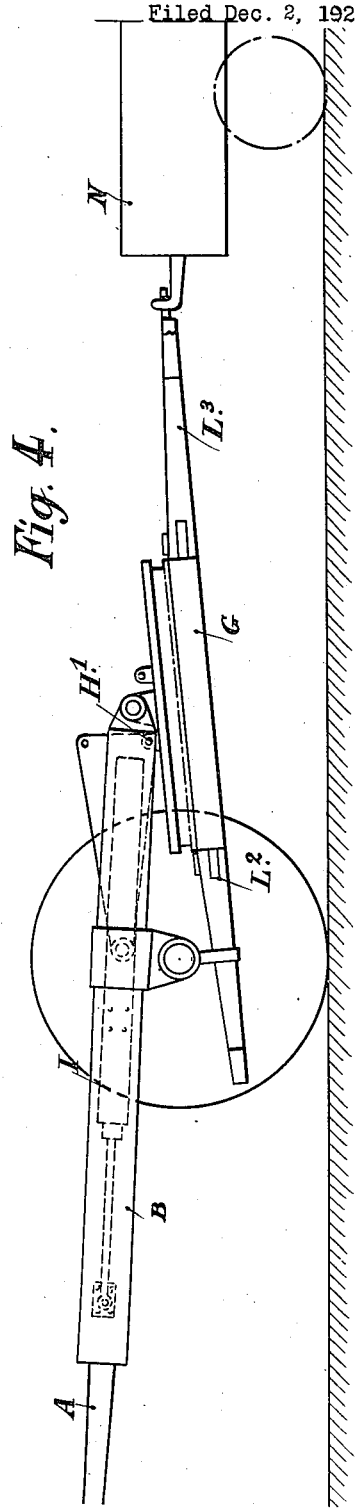

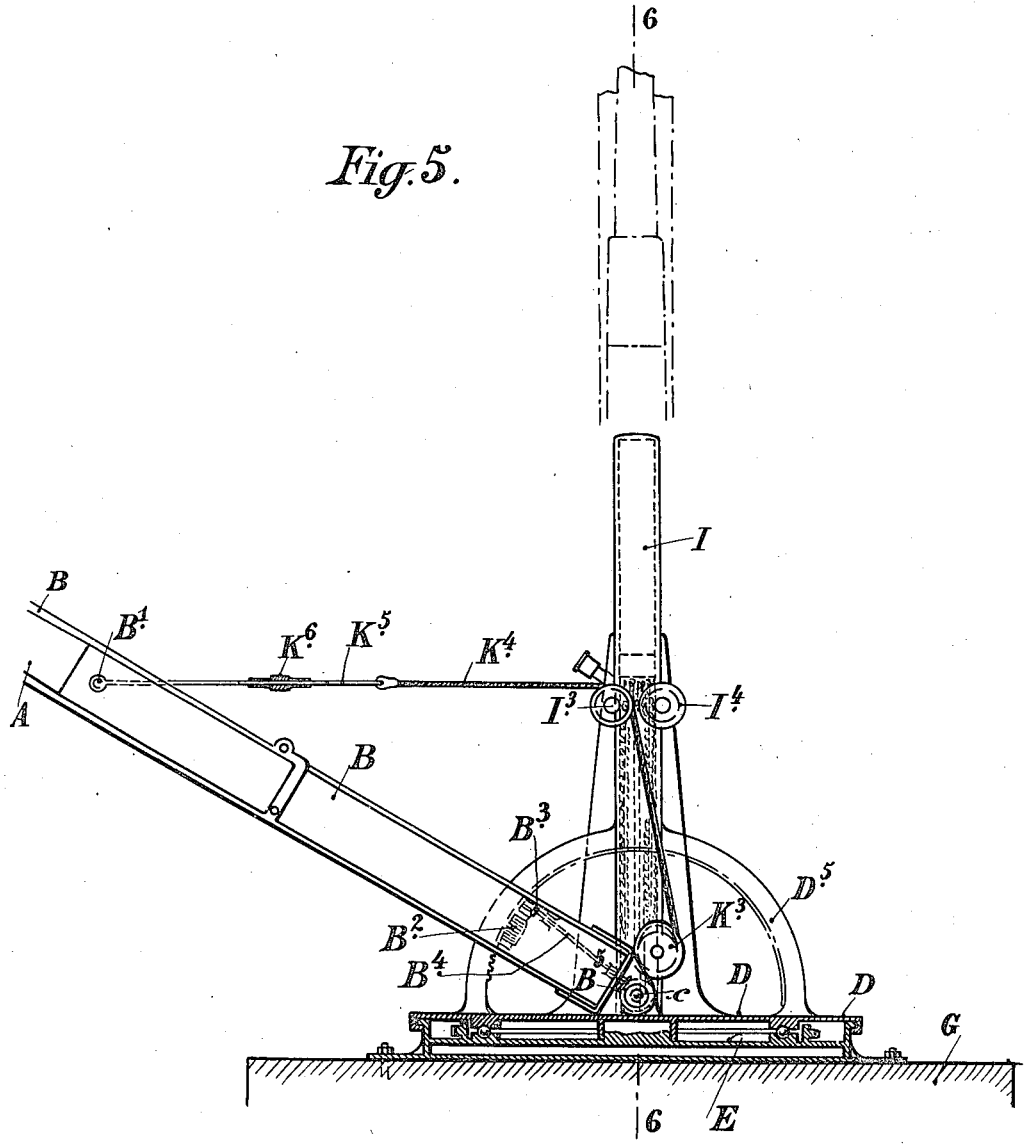

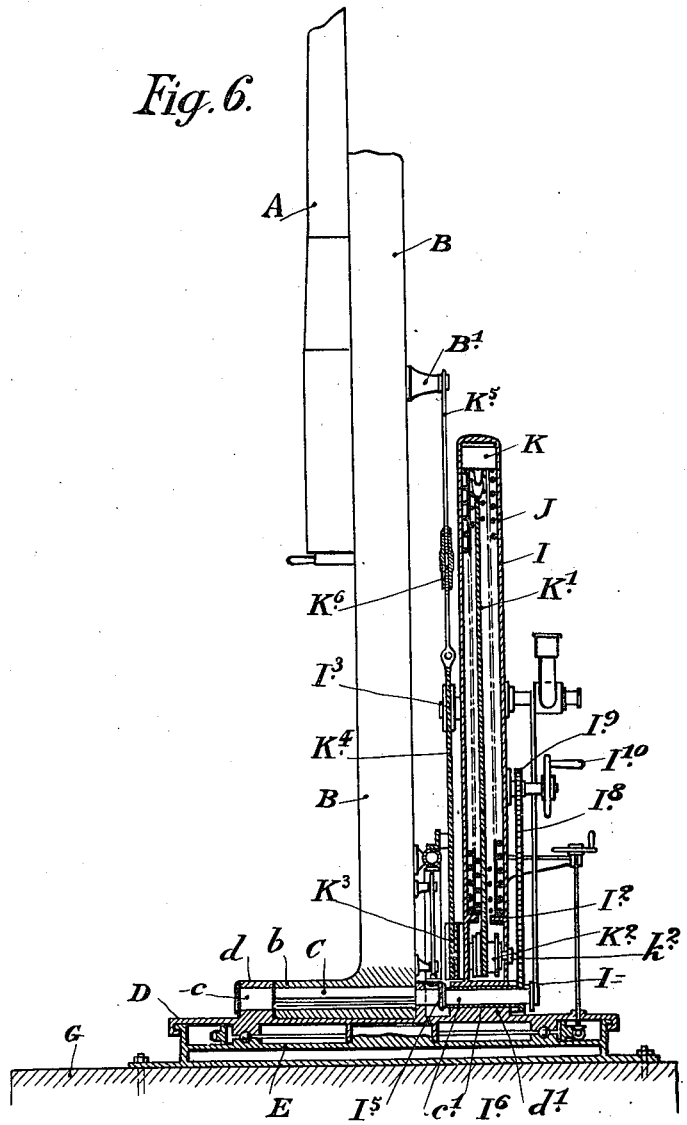

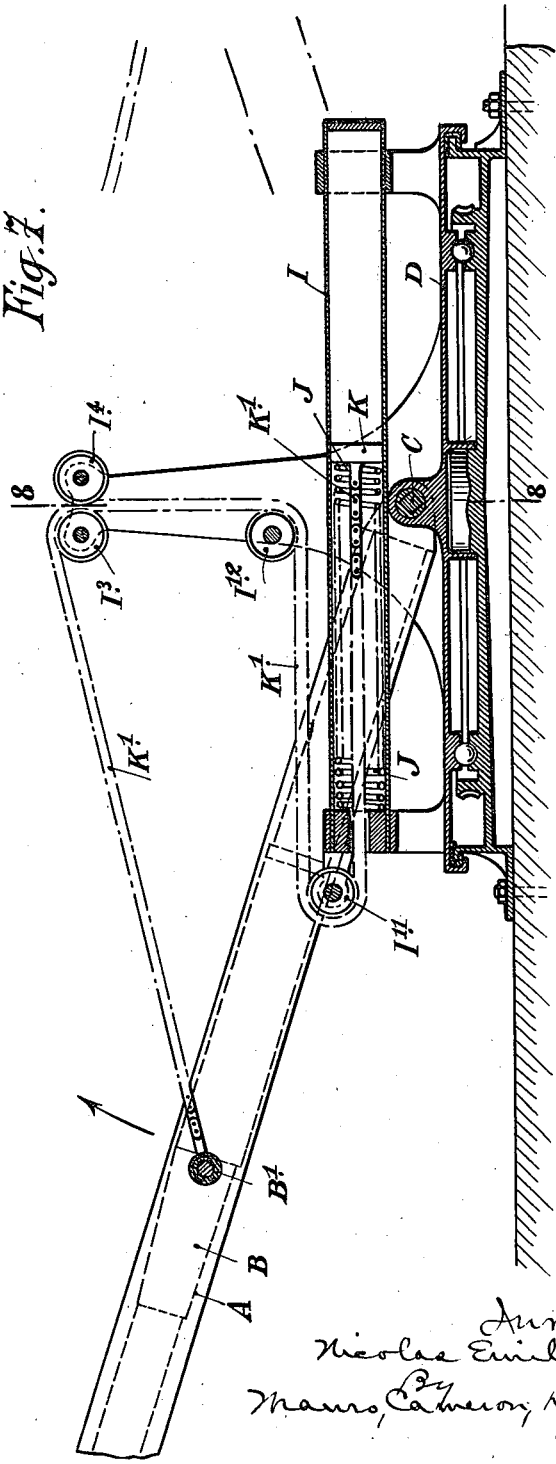

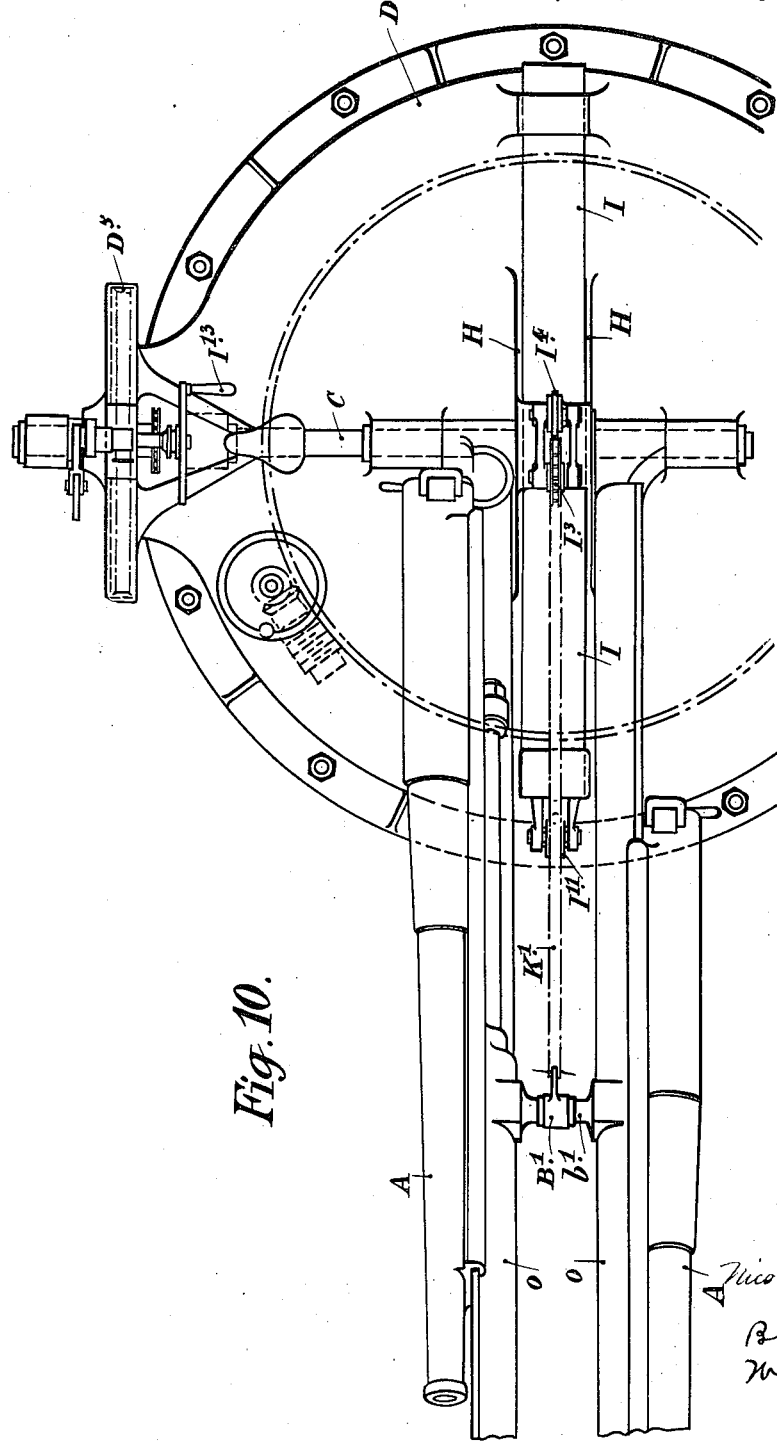

1,672,949

UNITED STATES PATENT OFFICE.

NICOLAS EMILIEN METHLIN, OF PARIS, FRANCE, ASSIGNOR TO SCHNEIDER & CIE., OF PARIS, FRANCE, A LIMITED JOINT-STOCK COMPANY OF FRANCE.

PIECE OF ORDNANCE MORE PARTICULARLY ADAPTED FOR FIRING AGAINST AIRCRAFT.

Application filed December 2, 1925, Serial No. 72,743, and in France December 16, 1924.

This invention relates to a piece of ordnance, the carriage of which is mounted upon a true or imaginary pivot, which can be transported upon a train of wheels or upon endless tracks, and which is more particularly adapted for firing against aircraft.

According to the invention the piece comprises a gun barrel recoiling in a cradle which lies on one of its sides, the said cradle being pivoted at its rear end about a horizontal shaft, the bearings of which are carried upon a platform moving about a true or imaginary pivot; the whole of the oscillating mass is supported, due to the fact that the cradle is connected at a point near the centre of gravity of the said mass, to a counter balancing device comprising a metallic hydraulic or pnuematic spring acting directly or through a transmission gear and in any case exerting its effort at a fixed point upon a support which point is situated substantially in the vertical plane passing through the pivoting axis of the cradle. This fixed point is, moreover, chosen in such a way that for any angle of inclination of the oscillating mass, balance is practically obtained.

A gun thus designed combines the following three essential advantages:

1. Due to the pivoting of the cradle about a shaft which is as close as possible to the plane of the platform, and consequently, very near to the ground, the forces tending to overturn the gun during firing are reduced to a minimum, whatever be, moreover, the inclination of the gun; the gun becomes consequently very stable for all firing angles.

2. Due to the fact that the cradle, thus pivoted at its rear end, is also turned on one of its sides, a field of vertical inclination of nearly 180° is obtained, the loading of the gun remaining possible in all positions.

3. The space beneath the oscillating means is made entirely free, so that, in order to load the gun on to a train of wheels, the axle of this train may be brought beneath the said mass, at a point such that the gun remains in a state approaching that of neutral equilibrium upon the axle; the front part of the oscillating mass practically balancing the whole of the back part of the platform and all it carries.

Various practical forms of construction of the invention are illustrated by way of example in the accompanying drawings.

Figure 2 is a similar sectional elevation, taken along the line 2—2 in Figure 1, the oscillating mass being shown vertical in this position.

Figure 3 is a plan view corresponding to Figure 1.

Figure 4 is a longitudinal elevation showing the gun mounted upon a train of wheels and coupled up to a limber.

Figure 5 is an elevation with a part in section, of a second form of construction.

Figure 6 is a sectional elevation taken along the line 6—6 in Figure 5, the oscillating mass being assumed to be in the vertical position.

Figure 7 is an elevation, with a part in section of a third form of construction, in which the piece comprises two gun barrels coupled together; this section is taken along line 7—7 in Figure 8 which is a section taken along the line 8—8 in Figure 7, the oscillating mass being assumed to be vertical.

Figure 10 is a plan corresponding to Figure 7.

Figure 1:
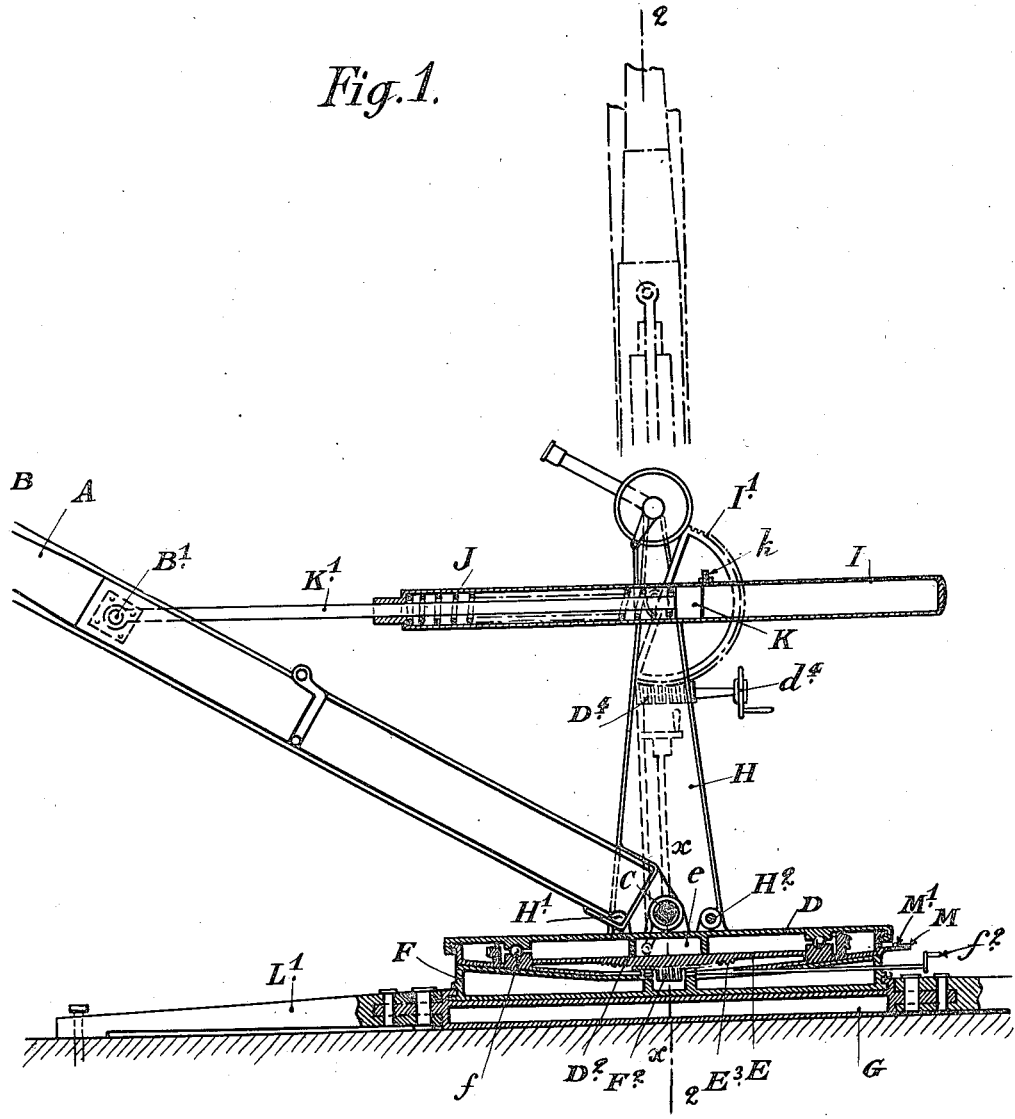
Figure 1 is a longitudinal elevation, partly in section, of the gun in one position for firing.

In the two first forms of construction, the gun comprises a single oscillating mass formed of a gun barrel A recoiling in a cradle B which is turned on one of its sides and is pivoted at its rear end, by means of a shaft C provided with two trunnions $c, c^1$, in bearings $d, d^1$ formed upon a platform D. The platform D turns in the known manner about a true or imaginary pivot; it engages by means of a flange $D^1$ upon a crown wheel E which forms a rolling track. The whole of the track E, the platform D and the gun it carries slides, by means of ribs $E^1$ forming arcs of circles upon the track E, in guideways of corresponding shape formed in a sole plate F, which turns upon the pedestal G about the vertical axis $x$—$x$ which is common to the sole plate and the pedestal.

The oscillating mass A—B which turns upon the platform D is without any attachment whatever upon its sides, so that free access is obtained underneath the mass, even for positions of small inclination to the right or to the left of the vertical positions passing through the pivoting axis of the cradle. The mass is practically entirely supported due to the fact that the cradle B is coupled up (at a point $B^1$ at the bottom of the latter and situated near the centre of gravity of the said oscillating mass) to a balancing device having a metal or other spring or buffer, arranged so as to exert its effort at a fixed point taken upon a support H which is situated in the vertical plane passing through the axis of the trunnions $c$, $c_1^1$.

In the example shown in Figures 1 to 4, the balancing device consists of a cylinder I, having two trunnions $i$ turning in bearings $h$ formed upon the fixed support H, rigidly connected to the platform D. In the cylinder I are located metal springs J, one end of which presses against one end of the cylinder, and the other against a piston K the rod $K^1$ of which is connected to the cradle B at $B^1$.

The fixed point upon which the counter balancing device exerts its effort, through the medium of the trunnions $i$, consists in this case of the bearings $h$ formed upon the support H. The position of the bearings $h$ is, moreover, fixed in such a way that for all angles of inclination of the oscillating mass balance is practically obtained.

The laying mechanisms may be constructed in various ways. The gun is trained, of course, by rotating the platform D upon its rolling track; the imaginary pivot may be completed, as shown in the drawing by a true pivot $e$ formed as a projection upon the track E upon which pivot fits a socket $D^2$ formed beneath the platform D. The track E may, for example, be provided with helical teeth $E^2$ upon which turns in the known manner a worm $D^1$ turning in bearings provided upon the platform D and actuated by a transmission gear leading to a hand wheel $D^3$. The gun is elevated, for example, by means of a worm $D^4$ actuated by a hand wheel $d^4$ and turning in bearings carried upon the platform D or the support H attached to the latter; the worm $D^4$ engages with a helical toothed sector $I^1$ which is attached to the cylinder I of the counterbalancing device and is keyed for this purpose upon an extended portion of one of the trunnions $i$ of this cylinder.

To the pedestal G of the platform may be pivoted in the known manner four arms $L^1$, $L^2$, $L^3$, $L^4$ the free ends of which may serve for securing the gun by means of anchoring pins while the pedestal G may itself be provided with openings through which pins may be driven.

It is to be noted that four arms $L^1$, $L^2$, $L^3$, $L^4$ do not form true anchoring trails but in this case only serve the purpose of providing for the gun a polygon of support which is sufficiently large for the vertical line passing through the centre of gravity of the whole of the gun to fall inside the said polygon for all firing positions.

The whole arrangement D—E—F—G is constructed in such a way as to enable the platform proper D to be made horizontal when the gun is set up, whatever be the irregularities in level of the ground upon which the pedestal G is placed. The track E is provided in the known manner with two levels M—$M^1$, placed at right angles to each other. In order to set the platform D so that it is horizontal, a worm $g^1$ turning in bearings carried upon the pedestal G is actuated by means of a handle $g$; this worm displaces a crown wheel $F^1$ provided with helical teeth, formed upon the sole plate F, which causes the whole of the sole plate F, the track E, the platform G and the gun mounted upon it to turn on the pedestal G. The handle $g$ is actuated until the bubble of the level $M^1$ comes between its datum lines. In this way the axis of the level M is brought into the line of greatest slope of the pedestal G. As the axis of the level M is in the vertical plane passing through the axis of a worm $F^2$ turning in the sole plate F and engaging with helical teeth $E^3$ formed upon the rolling track E, it is sufficient to actuate the worm $F^2$ by means of the handle $f^2$ until the bubble of the level M comes back between its datum lines, thus causing the track E to slide between the circular arc shaped guideways $f$ in order to bring the platform D into the horizontal, when the bubble of the level M will be between its datum lines.

It is easy to see that the gun described may be given inclinations in a vertical field approaching 180°, the gun being loaded without difficulty in all these positions, balance being always obtained, and the firing stresses passing wholly through the axis about which the cradle turns, without imposing any stress upon the laying mechanism.

For travelling, it is sufficient to incline the gun at a very small angle above the horizontal and a train of wheels may then be placed underneath the cradle, the axle of the latter being placed in a position, near the centre of gravity of the whole of the gun, such that by resting upon it as shown in Figure 4, the oscillating mass, it is possible to obtain without exerting a great effort a swinging movement enabling the whole arrangement G—F—E—D and the members it carries to be raised, the front part of the oscillating mass practically balancing the composite mass of the back part.

Naturally, for travelling, the arms $L^1$ and

L² are first folded towards the front, while the arms L³ and L⁴ are folded back in order to form a pintle hole for coupling the gun up to a limber N. The support H is preferably adapted to fold forward by turning about a shaft H¹ after the removal of a locking bolt H². Similarly the pivotal connection of the rod K¹ of the counter balancing is preferably removable, and it is possible by actuating the hand wheel $d^4$, after having rendered the piston K stationary by means of a set screw $k$ to turn the cylinder I of the counter balancing device so as to bring it into a position such that it is parallel to the cradle.

Figures 5 and 6 illustrate an example of the application of the new gun, with a fixed platform, mounted in position, for example, upon a concrete pedestal.

In this example the rolling track E upon which the platform D turns is fixed upon concrete bed forming a pedestal G.

As in the preceding example, the cradle B, which is turned on its side, is attached to a shaft C, the trunnions $c$, $c^1$ of which turn in bearings $d$, $d^1$ formed upon the platform D. The counter balancing device comprises a cylinder I in which are disposed springs J one end of which presses against the end I², and the other against the piston K to which is connected one end of a cable K¹. The other end of this cable is guided over a cylindrical drum K², upon the shaft K², of which is keyed another drum K³ forming a winding cam for a cable K⁴ connected to a rod K⁵, the length of which may be adjusted by means of a turnbuckle K⁶, and which is connected at B¹ to the bottom of the cradle B. The cable K⁴ is guided between two pulleys I³, I⁴ the shafts of which are carried by the cylinder I.

It is seen that in this case the cylinder I is fixed and forms at the same time a support for the pulleys I³, I⁴ upon one or the other of which, according as the gun is inclined to the left or to the right of the drawing, is chosen the fixed point upon which the counter balancing device exerts its effort.

The elevating mechanism may, as shown in the figures, comprise a fixed sector with helical teeth D⁵ rigidly supported upon the platform D, engaging with a worm B² turning in the cradle B, the shaft of which worm is rotated by a gearing B³—B⁴—B⁵ also carried upon the cradle, the pinion B⁵ engaging with a pinion I⁵ keyed upon a sleeve I⁶ moving in the bearing $d^1$, which may also form one end of the cylinder I. The liner I⁶ also carries a pinion I⁷ connected by a chain I⁸ to a toothed wheel I⁹ the shaft of which turns in the cylinder I and is actuated by the hand wheel I¹⁰.

In the example shown in Figures 7 to 10 the gun comprises two oscillating masses coupled together with brakes and recuperators, conjugated in the manner described in the U. S. Patent No. 1,487,695.

The two cradles B are both turned on one of their sides and are opposed to each other by their bottoms being pivoted about a common shaft C, turning in bearings formed as projections upon the platform D. The counter balancing device may in this case consist of a cylinder I which is fixed and arranged horizontally upon the platform between two supporting frame plates H. In the cylinders are disposed springs J as in the previous examples, the said springs pressing by one end against one end of the fixed cylinder, and by the other against a piston K. To this piston is connected one end of a chain K¹ guided over pulleys I¹¹, I¹² and between two pulleys I³, I⁴ upon one or the other of which is taken the fixed point upon which the balancing effort is exerted, the chain K¹ being on the other hand attached to a sleeve B¹ upon a shaft $b^1$ forming a cross stay between the cradle B and at the same time a communication duct between the recuperator-brakes O.

Figure 9:
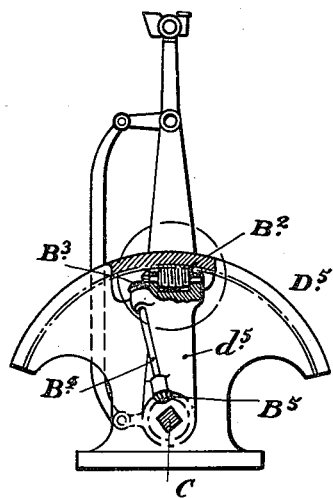
Figure 9 is a section taken along the line 9—9 in Figure 8.
Figure 8:
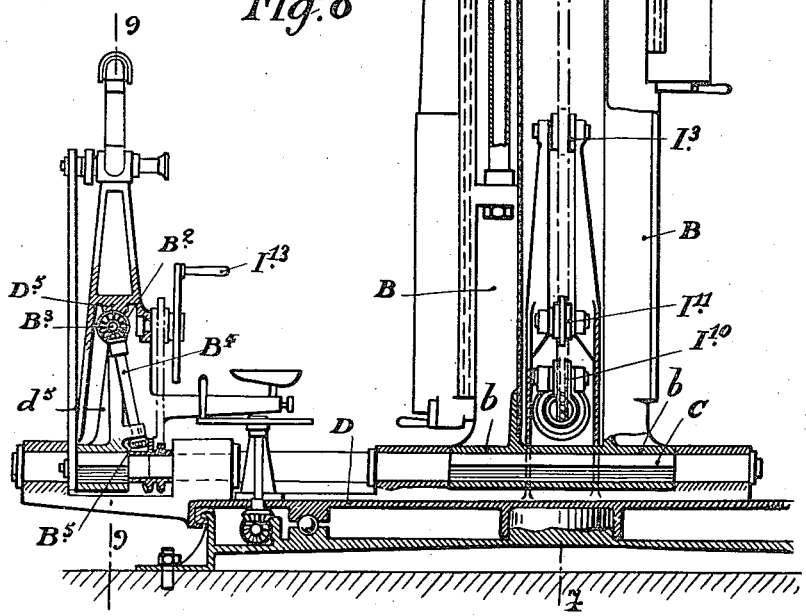

The elevating mechanism is more particularly shown in Figures 8, 9 and 10. The transmission gear comprises in this case, as in the previous example, a fixed helical toothed sector D⁵ attached to the platform D, with which sector engages a worm B² turning in a support $d^5$ keyed to an extended part of the shaft C rigidly attached to the cradles B; the movement is communicated to the worm B² through the gearing B³—B⁴—B⁵ which terminates in a hand wheel I¹³.

Having now particularly described and ascertained the nature of my said invention and in what manner the same is to be performed, I declare that what I claim is:—

1. Apparatus of the class described comprising a support, a cradle pivoted at one end on said support, a gun carried by said cradle, means on said support extending vertically above said pivot, and counterbalancing means operatively connecting said cradle and said first named means for counterbalancing the weight of the mass adapted to oscillate about said pivot.

2. Apparatus of the class described comprising a support, a cradle pivoted at one end to said support, a gun carried by said cradle, said cradle and gun constituting an oscillating mass, means on said support extending above said pivot, counterbalancing means operatively connected to said first named means, and means for connecting said counterbalancing means to said cradle at a point near the center of gravity of the oscillating mass.

3. Apparatus of the class described comprising a support, a cradle pivoted at one end to said support, a gun carried by said cradle, means on said support extending above said pivot, and resilient means operatively connected to said first named means and to said cradle at a point near the center of gravity of the oscillating mass constituted by said cradle and gun, and resilient means being adapted to counterbalance the weight of said oscillating mass.

4. In apparatus of the class described, the combination of a gun pivotally supported at one end and movable through approximately 180° in a vertical plane about said pivot, a substantially vertical support extending above said pivot, and counterbalancing means operatively connecting said support and said gun.

5. In apparatus of the class described, the combination of an oscillating mass movable through approximately 180° about a horizontal axis, and means for counterbalancing the weight of said mass in all positions, said means being connected to said mass near its center of gravity and being supported at a point between the limiting positions of movement of said mass.

6. Apparatus of the class described comprising, in combination, a support, a cradle pivoted at one end on said support, a gun carried by said cradle, mechanism including resilient means operatively connected to said cradle at a point near the center of gravity of the oscillating mass, and to said support, and means on said support for supporting the effort exerted by said resilient means at a point substantially in a vertical plane passing through the pivotal axis of said cradle.

7. Apparatus of the class described comprising, in combination, a support rotatable about a vertical axis, a cradle pivoted at one end to said support about a horizontal axis, a gun carried by said cradle, resilient means operatively connected to said cradle at a point near the center of gravity of the oscillating mass, and means for mounting said resilient means on said support at a point substantially in a vertical plane passing through said horizontal axis.

8. Apparatus of the class described comprising, in combination, a rotatable platform, a cradle, means for pivoting said cradle at the lower end thereof on said platform about a horizontal axis, a gun carried by said cradle, a support mounted on said platform, spring means mounted on said support, and means operatively connecting said spring means with said cradle for counterbalancing the weight of the mass oscillating about said horizontal axis.

9. Apparatus of the class described comprising, in combination, a rotatable platform, a cradle pivoted at the lower end thereof on said platform, a gun carried by said cradle, a support on said platform, a cylinder pivotally secured to said support, a piston in said cylinder, resilient means interposed between said cylinder and piston, means operatively connecting said piston and cradle, and means for rotating said cylinder about its pivot whereby said cradle is swung about said horizontal axis.

10. Apparatus of the class described comprising, in combination, a rotatable platform, a cradle pivoted on said platform, a gun carried by said cradle, a support pivoted on said platform, means normally maintaining said support in an upright position, spring means pivoted on said support, means operatively connecting said spring means with said cradle, whereby the weight of the gun and cradle is counterbalanced at all times, and means secured to said spring means for rotating the latter about its pivot whereby said gun is elevated.

11. Apparatus of the class described comprising, in combination, a support, a cradle pivoted at one end on said support, a gun carried by said cradle, mechanism including resilient means operatively connected to said cradle and support for counterbalancing the weight of the mass adapted to oscillate about said pivot, and means on said support for supporting the effort exerted by said mechanism at a stationary point which is substantially in a vertical plane passing through the pivotal axis of said cradle.

12. Apparatus of the class described comprising, in combination, a platform, a cradle pivoted at one end on said platform, a gun carried by said cradle, means for counterbalancing the weight of said cradle and gun about said pivot, and a plurality of members operatively connected to said platform and adapted to constitute anchoring members for the latter when said gun is being fired, one or more of said members being adapted to constitute draft means when said apparatus is being transported.

13. Apparatus of the class described comprising, in combination, a platform, ordnance apparatus pivotally mounted on said platform including a gun and counterbalancing means therefor, said ordnance apparatus being adapted to occupy substantially the horizontal plane of said platform, anchor means operatively connected to said platform, and means for transporting said apparatus including a pair of wheels and an axle connecting said wheels on which said apparatus is rested.

14. Apparatus of the class described comprising, in combination, a platform, a cradle pivoted on said platform, a gun carried by said cradle, a normally upright support pivotally mounted on said platform, mechanism including resilient means mounted on said upright support for counterbalancing the weight of said cradle and gun, said cradle, gun, upright support and mechanism being adapted to lie substantially in the horizontal plane of said platform, anchor members operatively connected to said platform, and means including an axle and pair of wheels for supporting said apparatus for transportation, one of said anchor members being adapted to constitute draft means for a limber.

15. A mounting for anti-aircraft guns comprising a platform, a gun cradle pivoted to said platform, means including a support pivoted to said platform, said cradle and support being adapted to occupy a position parallel to said platform, and a plurality of radially disposed anchor members pivoted to said platform, certain of said members constituting draft means for transporting the mounting.

In testimony whereof I have signed this specification.

NICOLAS EMILIEN METHLIN.